United States Defensive Publication [19] (H) [11] T977,009

Dumas et al. [43] Dec. 5, 1978

[54] GYPSUM WALLBOARD AND METHOD FOR PRODUCING SAME

[75] Inventors: David H. Dumas, Wilmington; David R. Warren, New Castle County, both of Del.

[73] Assignee: Hercules Incorporated, Wilmington, Del.

[21] Appl. No.: 889,693

[22] Filed: Mar. 24, 1978

Related U.S. Application Data

[63] Continuation of Ser. No. 791,437, Apr. 27, 1977, abandoned.

[51] Int. Cl.[2] ..... B32B 27/10

[52] U.S. Cl. ..... 428/476; 162/158; 428/537

[57] ABSTRACT

Disclosed is a paper-covered gypsum board comprised of a gypsum core and a paper cover sheet covering at least one side of said core, the surface of said paper cover sheet adjacent the gypsum core being surface sized with a sizing composition initially comprised of a hydrophobic cellulose reactive sizing agent and a nitrogen-containing condensation product.

8 Claims, No Sheets Drawing,

12 Pages Specification

The file of this unexamined application may be inspected and copies thereof may be purchased (849 O.G. 1221, Apr. 9, 1968).